United States Patent [19]

Bruce et al.

[11] Patent Number: 4,593,227
[45] Date of Patent: Jun. 3, 1986

[54] CATHODE RAY TUBE MOUNTING MEANS

[75] Inventors: Clarence A. Bruce, St. Albans; Yoong G. Koh, Jericho; Paul Matwey, Mt. Sinai; Mitchell H. Maiman, Holbrook; Wing C. Chan, Valley Stream; Thomas J. DeFreest, Bohemia, all of N.Y.

[73] Assignee: NCR Corporation, Dayton, Ohio

[21] Appl. No.: 752,289

[22] Filed: Jul. 5, 1985

[51] Int. Cl.[4] .................... H01J 31/00; H04N 5/645
[52] U.S. Cl. .................................. 313/482; 358/248; 358/254; 312/7.2
[58] Field of Search ............... 313/482; 358/248, 254, 358/245, 242; 312/7.2

[56] References Cited

U.S. PATENT DOCUMENTS

| 2,428,928 | 10/1947 | Cain | 313/482 |
|---|---|---|---|
| 2,692,983 | 10/1954 | Eisenkramer | 312/7.2 |
| 3,321,577 | 5/1967 | Burke et al. | 358/248 |
| 3,352,083 | 11/1967 | Stute | 312/7.2 |
| 3,614,519 | 10/1971 | Figlewicz et al. | 358/248 |
| 4,063,289 | 12/1977 | Veenendaal | 358/248 |
| 4,306,253 | 12/1981 | Nakamura | 358/254 |

FOREIGN PATENT DOCUMENTS 0051683  3/1983  Japan ...................... 312/7.2

Primary Examiner—Davis L. Willis
Assistant Examiner—William L. Oen
Attorney, Agent, or Firm—Wilbert Hawk, Jr.; Edward Dugas

[57] ABSTRACT

A cathode ray tube (CRT) mount which eliminates the need for mounting ears and provides for improved alignment of the CRT in the mount by providing a bezel having an opening therethrough for viewing the face of the CRT and a rear support member having an opening therethrough for receiving the rear portion of the CRT with resilient material being positioned on the bezel and the rear support in all areas that contact the CRT. Fasteners are used to urge the bezel and rear support member together to firmly mount the CRT. Means are provided for accurately aligning the rear support member to the bezel.

1 Claim, 2 Drawing Figures

CATHODE RAY TUBE MOUNTING MEANS

BACKGROUND OF THE INVENTION

The present invention is related to a mounting means for a cathode ray tube (CRT), and more particularly to a cathode ray tube mounting means that provides a slim profile and eliminates the need for mounting ears while providing for an improved alignment of the components.

Traditional CRT mounting techniques call for the addition of four metal tabs to a tension band which is affixed to the CRT. The tabs are typically referred to as mounting ears. In order to mount such a CRT in a plastic housing, mounting bosses are molded into the housing. The CRT is then retained by passing a screw through a large hole in the mounting ear and into the mounting boss molded into the housing. Large washers are generally used to keep the screwheads or boltheads from passing through the hole in the mounting ear. Two major problems occur with such a technique. The first being, a clearance must be provided around the mounting ear so that they do not interfere with the plastic housing. A second is that the CRT positioning is poor due to the inaccurate locating of the tension band and the mounting ears on the CRT glass. Excessive clearances and/or interferances result from poor CRT positioning. With the sizing of today's display monitors it becomes increasingly attractive to have the size of the housing as small as possible in relation to the size of the CRT screen. The mounting techniques which used mounting ears by necessity dictated that the cabinet, or housing, be sufficiently large in order to accommodate these projections.

In U.S. Pat. No. 4,467,244 entitled "Monitor Bracket" by R. G. Dickie there is disclosed a mounting arrangement which uses the mounting ears that are attached to the CRT. This patent generally sets forth the state of the art for ear type mountings.

Another patent of interest is U.S. Pat. No. 4,063,289 entitled "Cathode Ray Tube Mounting Means Including Lighting Means and Camera-Connecting Means" by C. T. Veenendaal. The mounting means disclosed in that patent is concerned with the solution of the problem of aligning a front graphic screen, placed over the CRT inplosion shield in such a manner so as to maintain the graphic screen substantially parallel to the face of the CRT so that when a camera is affixed to the face of the graphic screen the camera does not record a distorted image from the face of the CRT. Wedge shaped members are affixed to the CRT by means of an adhesive. A front casting is provided with guides conforming to the exterior surface of the wedge shaped members. The wedge shaped members are inserted into the guides and mounting elements, such as screws, clamp the front casting to the cathode ray tube.

It would be desirable to have a mounting means which did not require that the various mounting elements be affixed to or be formed as part of the CRT. For ease of assembly, the mounting means should be completely separable from the CRT so that upon replacement, no additional type of fabrication or glueing etc. would have to be done prior to inserting the CRT into the mount. With these problems and desirable features in mind, the inventors have created their present invention.

SUMMARY OF THE INVENTION

The present invention is, in the preferred embodiment, a mounting means for a cathode ray tube that is comprised of a bezel, defining an opening therethrough for viewing the face of the cathode ray tube which bezel has a plurality of fastener receptacles defined in the rear portion thereof. A resilient material is attached to the rear of the bezel for engagement with the face of the cathode ray tube. A rear support is provided having an opening defined therethrough for receiving the rear portion of the cathode ray tube with the rear support also having a plurality of holes around the outer periphery which correspond to the plurality of fastener receptacles that are on the bezel. A resilient material is attached to the rear support for engaging the rear surface of the cathode ray tube and a plurality of fasteners are inserted through the openings of the rear support and extend therefrom so as to engage the like corresponding plurality of fastener receptacles in the bezel. With the CRT positioned between the bezel and the rear support member, the fasteners are engaged so as to firmly mount the cathode ray tube between the bezel and the rear support. The resilient material on the bezel and the rear support being in engagement with the CRT.

From the foregoing, it can be seen that it is a preferred object of the present invention to provide an improved CRT mounting means.

It is another object of the present invention to provide a means for mounting a CRT without the need for mounting ears or other elements being affixed to the CRT body.

These and other objects of the present invention will become more apparent when taken in conjunction with the following description and associated drawings wherein like numbers indicate like parts and which drawings form a part of the present specification.

DESCRIPTION OF THE PREFERRED EMBODIMENT

Figure 1:
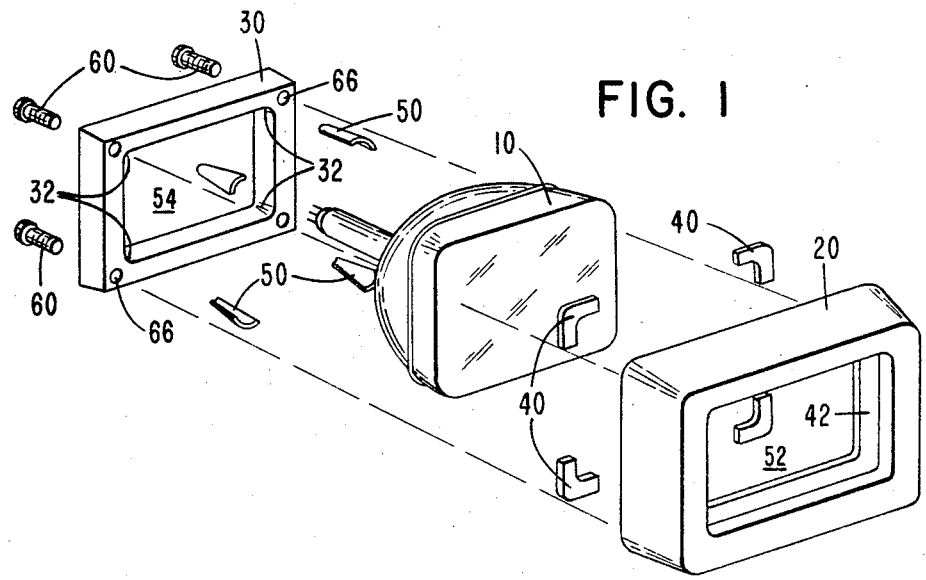
FIG. 1 is an exploded perspective view of the mounting means of the present invention and a CRT tube.

Referring to FIG. 1, a bezel 20 has an opening 52 therethrough defined by an inner flange member 42, which opening is slightly less than the width and height of a CRT tube 10. The bezel 20 may be molded from a plastic material such as LEXAN or ABS. Four resilient L-shaped pads 40 are mounted to the bezel 20 along the rear surface of the inward projecting flange 42. In the preferred embodiment of the invention, the resilient pads 40 were positioned at the ends of the CRT diagonal axes and were contoured to match the curvature of the face of the CRT and were made from rubber. A rear support 30 defines an opening 54 which is adapted to receive the rear portion of the CRT 10. A plurality of holes 66 are positioned around the outer periphery of the rear support 30. Resilient material 50, configured to conform to the rear surface of the CRT 10, is adapted to be affixed to inner surfaces 32 of the rear support member 30. A plurality of fasteners 60, which may be self-tapping, double threaded screws, extend through the openings 66 and engage corresponding fastener receptacles 64 (shown in FIG. 2) located in the bezel 20.

Figure 2:
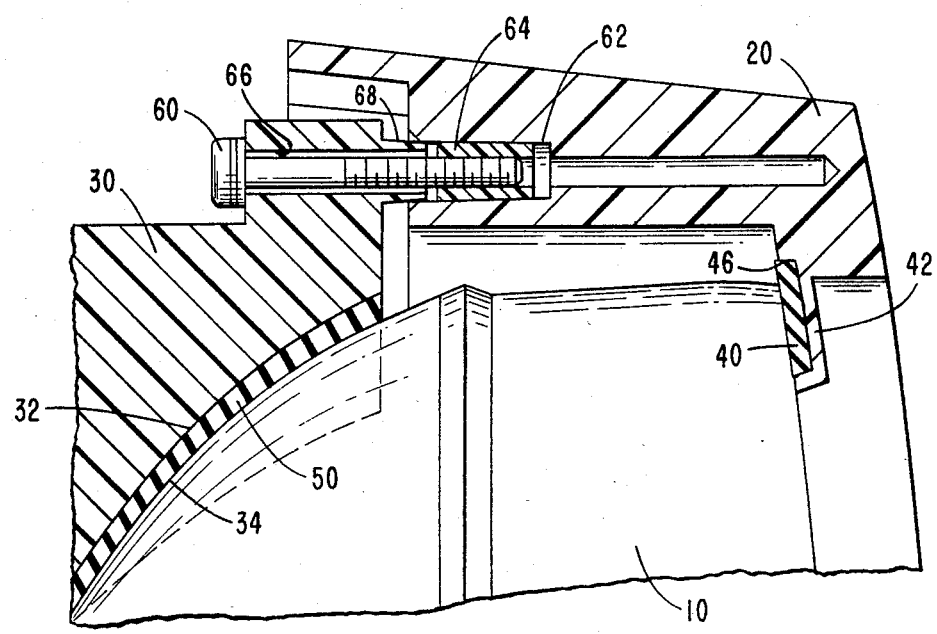
FIG. 2 is an enlarged, partially sectioned view of a segment of the mounting means of FIG. 1.

Referring now to FIG. 2, the bezel 20 has an inwardly projecting flange portion 42 which on the back surface thereof has a defined recess 46, corresponding to the configuration of the resilient pads 40, for receiving the pads. A plurality of fastener receptacle openings 62 are drilled through the rear surface of the bezel 20, and a tappable material is inserted into the fastener opening 62 to form the fastener receptacle 64.

The rear support 30 has the plurality of openings 66 which are adapted to receive the fasteners 60, which in the preferred embodiment are self-tapping screws. The screws are screwed into engagement with the tappable material 64. Projecting cylindrical portions 68 extend from the front surface of the rear support 30 and have an outer diameter which is slightly smaller than the diameter of the drilled openings 62 such that as the rear support 30 is urged forward against the bezel 20 and the projections 68 slidably engage the defined openings 62 so as to accurately align the rear support 30 with the bezel 20. The rear portion 30 also has four surfaces 32 which conform in shape to the shape of the rear surface 34 of the CRT 10. A resilient material 50 is affixed to the rear support 30 in the area of the curved surface 32. The resilient material may be rubber pads and/or other like material, preferably formed to the shape of the rear portion of the CRT. The thickness of the material is chosen so as to provide protection from any dynamic shock that might be incurred by the mounting means.

To assemble the CRT in the mounting means, the eight resilient pad members are each bonded to their respective locations in the bezel and the rear support using a CYANDACRYLATE adhesive. The bezel is placed on a flat surface with the front portion of the bezel facing down. The CRT is then placed into the bezel with the CRT face contacting the four resilient pads. The rear support is then placed over the rear of the CRT and urged downwards until its resilient pads contact the rear of the CRT. The position of the CRT and the rear support are adjusted, if necessary, to align the holes on the rear support with the fastener receptacles in the bezel. The self-tapping, double threaded screws and optional washers may then be inserted through the holes 66 and the screws tightened to a predetermined torque level so that the CRT is retained with sufficient preload force so as to partially compress the resilient pads 40 and 50. Because the tolerances used to manufacture the CRT are much more exact than those used to affix the prior art ears and to drill the holes through the ears and because in the present invention the inventors utilize projecting cylindrical portions 68 to engage complementary openings as the reference for the alignment of the mounting means, an improved alignment accuracy is achieved. In addition, by eliminating the need for ears a much-reduced-in-size bezel may be used. A slim line cabinet (not shown) can then be extended around the rear portion of the CRT in contact with the bezel 20.

From the foregoing description, it can be seen that the present invention provides a cathode ray tube mounting means that will permit the mounting of the cathode ray tube into a housing without the use of traditional mounting ears being attached to the cathode ray tube. The direct advantage of this mounting apparatus is that it allows for the exterior of any housing to be the minimum size necessary to surround the cathode ray tube. In addition, this apparatus permits the CRT to be more accurately positioned in the mounting means such that undesirable interferences or excessive clearances are avoided. The end result is a smaller external size for the product as well as a better and more consistent quality appearance.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

We claim:

1. A cathode ray tube mounting means for mounting a cathode ray tube comprising:

a bezel having an opening therethrough for viewing the face of the cathode ray tube, said opening defined by an inner projecting flange member having a recess on the back surface thereof and having a plurality of fastener and cylindrical alighnment receptacles defined in the rear portion thereof;

a resilient material attached in the recess of said inner flange member of said bezel for engagement with the face of the cathode ray tube for retaining the face of the cathode ray tube at a relatively fixed distance within the bezel;

a rear support defining an opening therethrough for receiving the rear portion of the cathode ray tube, said rear support having an inner surface conforming to the shape of the rear portion of the cathode ray tube, said rear support also having a plurality of holes around the outer periphery thereof corresponding to the plurality of fastener receptacles defined in the rear portion of said bezel and a plurality of rigid cylindrical alignment projections adapted for engagement with said cylindrical alignment receptacles;

resilient material shaped to conform to the shape of the cathode ray tube and attached to said rear support for engaging the rear surface of the cathode ray tube; and a plurality of fastener means extending through the plurality of holes in said rear support and adapted to engage the plurality of fastener receptacles in said bezel so as to cause said plurality of rigid cylindrical alignment projections to engage said cylindrical alignment receptacles so as to accurately align said bezel to said rear support and in turn to align said cathode ray tube with respect to said bezel and said rear support.

* * * * *